United States Patent
Trojer et al.

(10) Patent No.: US 9,350,517 B2
(45) Date of Patent: May 24, 2016

(54) BANDWIDTH ASSIGNMENT FOR MULTI-LINE TDD SYSTEMS

(71) Applicant: Telefonaktiebolaget L M Ericsson (publ), Stockholm (SE)

(72) Inventors: Elmar Trojer, Taby (SE); Per-Erik Eriksson, Stockholm (SE); Chenguang Lu, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 247 days.

(21) Appl. No.: 14/114,794

(22) PCT Filed: Sep. 10, 2013

(86) PCT No.: PCT/SE2013/051054
§ 371 (c)(1),
(2) Date: Oct. 30, 2013

(87) PCT Pub. No.: WO2014/039004
PCT Pub. Date: Mar. 13, 2014

(65) Prior Publication Data
US 2015/0349938 A1    Dec. 3, 2015

Related U.S. Application Data

(60) Provisional application No. 61/698,922, filed on Sep. 10, 2012.

(51) Int. Cl.
*H04L 5/00* (2006.01)
*H04L 12/26* (2006.01)
(Continued)

(52) U.S. Cl.
CPC ............ *H04L 5/0064* (2013.01); *H04L 5/1469* (2013.01); *H04L 41/0896* (2013.01); *H04L 43/062* (2013.01); *H04B 3/32* (2013.01); *H04L 5/0044* (2013.01)

(58) Field of Classification Search
CPC ... H04L 5/0064; H04L 4/0896; H04L 43/062; H04L 41/0896; H04L 5/1469; H04L 5/0044; H04B 3/32
See application file for complete search history.

(56) References Cited

U.S. PATENT DOCUMENTS

| | | |
|---|---|---|
| 2002/0031098 A1 | 3/2002 | Pfeiffer |
| 2009/0103498 A1 | 4/2009 | Nilsson et al. |

(Continued)

FOREIGN PATENT DOCUMENTS

| | | |
|---|---|---|
| EP | 0917315 | 5/1999 |
| WO | WO-2012/019348 | 2/2012 |

OTHER PUBLICATIONS

Written Opinion of the International Preliminary Examining Authority, Application No. PCT/SE2013/051054, dated Aug. 26, 2014, 7 pages.

(Continued)

*Primary Examiner* — Paul H Masur
(74) *Attorney, Agent, or Firm* — Nicholson De Vos Webster & Elliott, LLP

(57) ABSTRACT

Transceiver node and method therein for enabling dynamic bandwidth assignment in bi-directional Time Division Duplexing (TDD) multicarrier communication over wire lines. The transceiver node is operable to be coupled to a plurality of loops, wherein each loop is terminated by a respective network terminal (NT). The method comprises collecting traffic reports from local and remote queues associated with uplink and downlink traffic on the plurality of loops, and determining an actual demand for upstream and downstream bandwidth, respectively, for each of the plurality of loops, based on the collected traffic reports. The method further comprises deriving an Upstream/Downstream (US/DS) frame partitioning based on the determined actual demand for upstream and downstream bandwidth, and providing an indication of the derived US/DS frame partitioning to the NTs. NTs are then scheduled in accordance with the derived partitioning.

20 Claims, 7 Drawing Sheets

(51) Int. Cl.
*H04L 12/24* (2006.01)
*H04L 5/14* (2006.01)
*H04B 3/32* (2006.01)

(56) References Cited

U.S. PATENT DOCUMENTS

| | | | |
|---|---|---|---|
| 2013/0272177 A1* | 10/2013 | Wei | H04L 5/14 370/294 |
| 2014/0029406 A1* | 1/2014 | Liang | H04J 3/10 370/201 |
| 2015/0215059 A1* | 7/2015 | Kerpez | H04M 11/062 379/406.01 |

OTHER PUBLICATIONS

PCT Notification of Transmittal of the International Search Report and the Written Opinion of the International Searching Authority for PCT Counterpart Application No. PCT/SE2013/051054, (Jan. 8, 2014), 11 pages.

Rong, B., et al., "Integrated Downlink Resource Management for Multiservice WiMAX Networks", *IEEE Transactions on Mobile Computing*, vol. 6, No. 6, (Jun. 2007), pp. 621-632.

ITU-T G.984.3; Gigabit-capable Passive Optical Networks (G-PON): Transmission convergence layer specification, (Mar. 2008), 146 pages.

\* cited by examiner

--Prior Art--

DSL TDD DBA architecture

BANDWIDTH ASSIGNMENT FOR MULTI-LINE TDD SYSTEMS

CROSS-REFERENCE TO RELATED APPLICATIONS

This application is a National stage of International Application No. PCT/SE2013/051054, filed Sep. 10, 2013, which claims priority to U.S. Application No. 61/698,922, filed Sep. 10, 2012, which are hereby incorporated by reference.

TECHNICAL FIELD

The herein suggested solution relates to the field of bi-directional multi-line communication systems, in which transmit and receive signals are separated in time, i.e. using time-division duplexing (TDD).

BACKGROUND

Copper transmission link technologies such as Digital Subscriber Line (xDSL) are providing, as of today, access broadband services to 286 million subscribers worldwide. Different generations of DSL technology, such as Asymmetric DSL (ADSL), ADSL2(+), Very high bitrate DSL (VDSL) and VDLS2 provide data rates in the range from several Mb/s up to 100 Mb/s over ranges from 1 km to 8 km. Recently, the need for Gigabit speeds on telephone-grade copper has arisen for broadband access, home networking, as well as 4G mobile network backhaul, such as e.g. LTE S1/X2 interface backhaul.

New generations of DSL-like systems can provide this capacity on very short lines/loops in the area of 50-200 meters. Such loops provide 100 to 200 MHz of bandwidth for data transmission, as compared to earlier maximum bandwidths of about 30 MHz for legacy systems. Unlike classical DSL systems transmitting uplink and downstream data in different bands of the copper in a frequency-division duplexing scheme (FDD), Gigabit DSL utilizes more hardware-friendly time-division-duplexing (TDD), where upstream and downstream data is utilizing the whole copper spectrum in a time-shared manner—i.e. the transceiver either transmits or receives at a given point in time.

Block transmission using the Fast Fourier Transform (FFT) and its inverse, IFFT, for modulation and demodulation, respectively, is the dominating modulation scheme in today's communication systems. This modulating scheme is often referred to as multicarrier modulation. One of the two most important variants of multicarrier modulation is passband transmission using complex-valued transmit/receive signals, which is referred to as orthogonal frequency division multiplexing (OFDM). OFDM is used, for example, in wireless communication systems, such as LTE. The second one is baseband transmission using real-valued transmit/receive signals, which is referred to as DMT. DMT is used, for example, in wireline communication systems, such as xDSL systems using e.g. copper cables.

Simultaneous transmission and reception of signals requires a scheme for separating the two signals. Separation in time, also referred to as TDD, is a suitable method for low-complexity, and thus low-cost, transceiver implementations. The cost can be kept low, e.g. since there is a reduced need for echo cancellation when using TDD, as compared to when using frequency division. Examples of TDD communication systems include e.g. transmission over any kind of copper transmission media, such as twisted pair, CAT5, etc. TDD systems may be used for various applications providing various services, such as e.g. Internet access and base-station backhaul. The communication may be, and is being, standardized in different variants, such as G.fast and G.hn, but may also be used in different non-standardized forms.

Time division duplexing (TDD) is a well-known transmission scheme in telecommunication systems such as ATM, GSM, LTE-TDD, and different flavors of Ethernet Passive Optical Network (EPON) and Gigabit-capable Passive Optical Networks (GPON). Thereby bi-directional transmission between a line terminal (LT) and a network terminal (NT) is accomplished by utilizing a common media for upstream and downstream transmission in non-overlapping instances of time, i.e. time-slots.

In previous generations of Digital Subscriber Line (DSL) technology, frequency division duplexing (FDD) was used, where non-overlapping frequency bands on the copper wire are used to transmit upstream and downstream simultaneously. Such a structure mitigates near-end crosstalk (NEXT) by design. In order to mitigate far-end crosstalk (FEXT) vectoring might be used to reach near-to channel capacity.

Recently, standardization of the new DSL standard in ITU-T, called G.fast, has started utilizing TDD instead of FDD in the physical layer to reduce system complexity and thereby cost. In contrary to FDD, TDD does have a NEXT problem if simultaneous transmission in opposite direction on wires of a common binder happens. It is the task of the framer to construct non-overlapping frames in time to prevent NEXT. FEXT may be cancelled by vectoring.

The FIG. 1 exemplifies NEXT collisions that can occur in TDD DSL systems. NEXT happens when, on local or remote side, a transmitter sends and a receiver receives at the same time. In frame N, transmission to $NT_A$ and $NT_B$ are equal in terms of downstream (DS) and upstream (US) partition, which may also be referred to as partitioning, of the whole frame. As no overlap occurs between US and DS communication, no NEXT is generated. In frame N+1, $NT_B$ transmits longer in downstream than $NT_A$ resulting in harmful near end cross-talk, NEXT.

SUMMARY

It would be desirable to improve the utilization of transmission resources in bi-directional TDD over wire lines. Herein, a solution is provided, which enables improving the utilization of such transmission resources. This is achieved by a transceiver node and a method therein for enabling dynamic bandwidth assignment.

According to a first aspect, a method is provided, which is to be performed by a transceiver node operable to perform bi-directional TDD multicarrier communication over wire lines, and further operable to be coupled to a plurality of loops, where each loop is terminated by a respective network terminal, NT. The method comprises collecting traffic reports from local and remote queues associated with uplink and downlink traffic on the respective plurality of loops. An actual, current, demand for upstream and downstream bandwidth (resources), respectively, is determined for each of the plurality of loops, based on the collected traffic reports. Further, an US/DS frame partitioning is derived based on the determined demand for upstream and downstream bandwidth, or resources. The derived US/DS frame partitioning is then indicated to the NTs. Then, the NTs may be scheduled in accordance with the derived US/DS frame partitioning. By performing the method dynamic bandwidth assignment, DBA, is enabled. DBA may also be referred to as dynamic resource assignment, DRA.

According to a second aspect, a transceiver node is provided, which is operable to perform bi-directional TDD multicarrier communication over wire lines, and to be coupled to a plurality of loops, where each loop is terminated by a respective network terminal, NT. The transceiver node comprises a collecting unit, adapted to collect traffic reports from local and remote queues associated with uplink and downlink traffic on the plurality of loops. The arrangement further comprises a determining unit, adapted to determine an actual demand for upstream and downstream bandwidth, respectively, for each of the plurality of loops, based on the collected traffic reports. The arrangement further comprises a deriving unit, adapted to derive an US/DS frame partitioning (border location within a frame) based on the actual demand for upstream and downstream bandwidth; and a providing unit, adapted to provide an indication of, i.e. to indicate, the derived US/DS frame partitioning to the NTs. The arrangement may further comprise a scheduling unit, adapted to schedule transmission to NTs in accordance with the derived US/DS frame partitioning.

The above method and transceiver node may be implemented in different embodiments, which will be described in the detailed description.

BRIEF DESCRIPTION OF THE DRAWINGS

The suggested technology will now be described in more detail by means of exemplifying embodiments and with reference to the accompanying drawings, in which.

Figure 1:
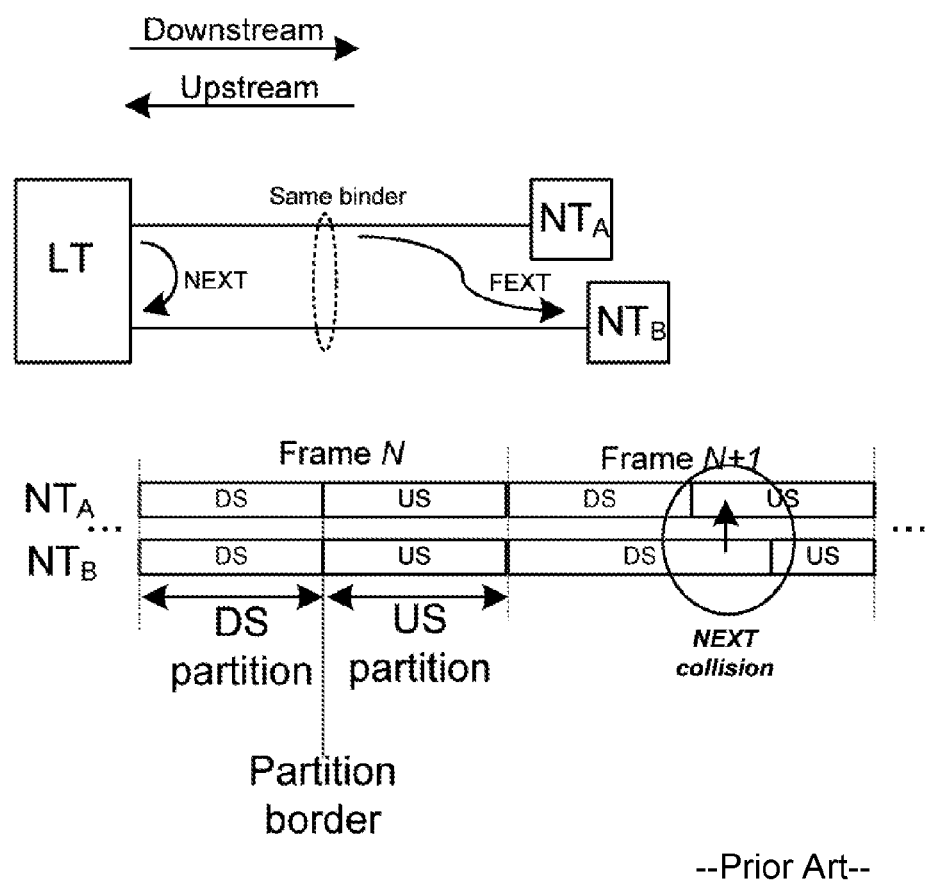
FIG. 1 illustrates so-called NEXT collision in TDD DSL.

The drawings are not necessarily to scale, emphasis instead being placed upon illustrating the principles of the technology disclosed herein.

DETAILED DESCRIPTION

In the following description, for purposes of explanation and not limitation, specific details are set forth such as particular architectures, interfaces, techniques, etc. in order to provide a thorough understanding of the concept described herein. However, it will be apparent to those skilled in the art that the described concept may be practiced in other embodiments that depart from these specific details. That is, those skilled in the art will be able to devise various arrangements which, although not explicitly described or shown herein, embody the principles of the described concept and are included within its spirit and scope. In some instances, detailed descriptions of well-known devices, circuits, and methods are omitted so as not to obscure the description according to the present concept with unnecessary detail. All statements herein reciting principles, aspects, and embodiments of the described concept, as well as specific examples thereof, are intended to encompass both structural and functional equivalents thereof. Additionally, it is intended that such equivalents include both currently known equivalents as well as equivalents developed in the future, e.g., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as e.g. "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to Application Specific Integrated Circuit(s) (ASICs), and (where appropriate) state machines capable of performing such functions.

It may be concluded that, in order to avoid NEXT, the border between a US and a DS partition in a frame, as well as frame start/length, has to be the same for all lines in a (the same) cable binder. The framer in the NT has to assure these conditions to operate all lines with maximum capacity.

Given the analysis above, the operator would define a symmetry ratio such as e.g. "80% down/20% up" to be used on all NT ports hosting LTs connected to wires in the same binder. This corresponds to fixing the partition border, or partitioning, in FIG. 1 and keeping it static for all frames. Symmetry ratio is directly coupled to US and DS partitions; US_partition is defined as the number of DMT symbols dedicated to US divided by all symbols that constitute a full frame. DS_partition=1−US_partition. For example, if a frame consists of 16 symbols, and 4 are configured for DS: DS_partition=¼ and US_partition=¾.

As an example, let's assume that $NT_A$ is connected to a short/noiseless loop providing a total capacity of 600 Mbps whereas $NT_B$ is connected to a longer/poorer loop only providing 80 Mbps. Given a fixed symmetry ratio of 80/20, $NT_A$ would get 480 Mbps DS and 120 Mbps US, whereas $NT_B$ gets 64 Mbps DS and 16 Mbps US. Now if $NT_B$ wants to upload a huge junk of data (burst), it is restricted to 16 Mbps although the line is basically able to push 80 Mbps given no downstream transmission.

To take the example further, assume the case where $NT_A$ instantaneously only utilizes 100 Mbps DS of its provisioned 480 Mbps and $NT_B$ only 20 Mbps of its 80 Mbps but trying to upload a huge amount of data upstream. This is not possible according to prior art solutions.

In this case, according to the inventors, it would be beneficial to be able to dynamically shift the partition border, short-term, such that more US traffic was allowed, for better overall capacity utilization. In the example given above, the traffic on the line between the LT and $NT_A$ would allow for an instantaneous 17/83 (DS/US) ratio, whereas the traffic on the line between the LT and $NT_B$ would allow for a 25/75 (DS/US) ratio. In order to avoid NEXT, 25/75 is the ratio to use, thus allowing $NT_B$ to burst with 60 Mbps instead of 20 Mbps as in the fixed case—which would be a clear advantage.

In DSL TDD, each line has a given, exclusive capacity (point-to-point, p2p), but statistical multiplexing between US/DS would provide overbooking possibilities optimizing overall capacity utilization. However, such an algorithm should take neighboring lines into account in order to prevent the NEXT collision problem.

Figure 2:
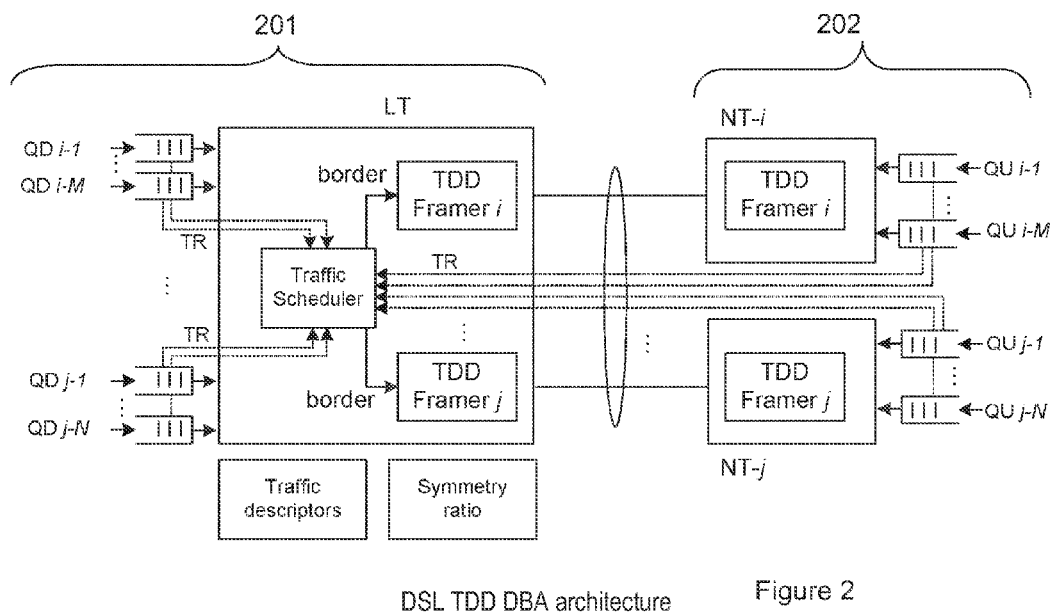
FIG. 2 illustrates a DSL TDD DBA architecture.

The herein suggested technology relates to a dynamic bandwidth assignment (DBA) apparatus providing maximum capacity utilization in a multi-line DSL TDD block transmission system. An example of a multi-line DSL TDD block transmission system and an exemplifying apparatus structure is shown in FIG. 2.

On a high level, an LT contains several ports at which remote NTs are connected via p2p copper pairs that run in the same binder. Framers are synchronized providing equal start time and frame size (in terms of #DMT symbols). At the LT side, downstream queues (QD) buffer frames to be delivered to NTs. The same structure, i.e. upstream queues (QU), can be found at the NT side for upstream transmission. Further below, the downstream queues will be referred to as local queues and the upstream queues will be referred to as remote queues. Queues can either be arranged bi-directionally, e.g. a p2p pair of QD and QU, assigned to a given line; or multi-cast, i.e. p2mp, a single QD or QU assigned to all (broadcast) or a group (multi-cast) of lines. A traffic scheduler, which may also be denoted e.g. "DBA engine", could collect traffic reports (TR) from all queues e.g. in a given cycle of e.g. 1 ms, to learn about the buffer occupancy level, e.g. the fill status in bytes, in each queue. For local queues, i.e. queues at the same side of the lines as the traffic scheduler, the current fill status may be easily accessed. For queues at the remote end, i.e. other side of the lines, a request/report round-trip could be implemented in the overhead channel of the link.

For a good result, information on the current US and DS demand could be used together with information on a respective configured traffic profile for the lines. The queue information given by the collected TRs could e.g. be used together with information given by a traffic descriptor TD for each queue. Combining this information enables the traffic scheduler to decide a suitable frame DS/US partitioning for the upcoming frame(s), which partitioning is to be used by each individual framer to optimize link utilization. It should be noted that it is assumed that each queue has one TD assigned to it, and that each line can have more than one QD and QUs. The Framer may distribute the partitioning information for each frame to the remote end to be used by NT's framer.

Traffic Descriptor, TD

A traffic descriptor TD assigned 1:1 to a queue can be described according to the following tuple:
TD=(F,A,M,p), where
F stands for "fixed rate": This rate is always reserved on the link direction where the queue is installed, regardless if there is actual traffic to be send.
A stands for "assured rate": This rate is assured in a sense that the link has to provide the rate when needed. If actual assured traffic is not filling up the configured rate A, it can be used by other lines in whatever direction needed.
M stands for "maximum rate": This rate specifies the absolute maximum rate (peak rate) that should be passed through that queue
p (optional) stands for "priority": priority to take non-assured bandwidth from common pool of remaining capacity over all loops It should be noted that a traffic descriptor, TD, can be configured to represent a sub-class of the most general traffic profile comprising fixed, assured, and non-assured rate components. For example, in order to configure a simple fixed rate service, only the parameter F has to be set. Also, when intending to send in both US and DS, each direction of a line must have at least one queue assigned, and could have more than one, e.g. as many as 4.

If we denote the $TD_{D,i-j}$ as the traffic descriptor for downstream queue $QD_{i-j}$ of port i and (queue) number j, with its rate components ($F_{D,i-j}$, $A_{D,i-j}$, $P_{D,i-j}$) and correspondingly $TD_{U,i-j}$ descriptors of the jth uplink queue on port i, then, for each link, the following limitation has to hold. "DS_partition" and "US_partition" are the configured ratios of downstream and upstream time per total frame length, and $C_i$ denotes the attainable rate of link i in either downstream D or upstream U, cf. $C_{i,D}$ and $C_{i,U}$.

$$\mathrm{Sum}_j(F_{D,i\text{-}j} + A_{D,i\text{-}j}) \leq DS\_partition * C_{i,D} \qquad (1.1)$$

$$\mathrm{Sum}_j(F_{U,i\text{-}j} + A_{U,i\text{-}j}) \leq US\_partition * C_{i,U} \qquad (1.2)$$

The formulas above represent a statement of physical possibility or impossibility to provide a given configured traffic mix over a physical line of a given copper/noise quality. The statement imposes provisioning constraints on the operator, and it defines a business constraint on the operators' ability to sell service commitments on a particular link.

Scheduler Cycle

An LT operates in cycles when allocating capacity to all its lines in consecutive blocks of a multiple of a TDD frame duration. Given a frame duration of 1 ms, a possible algorithm could work in a cycle of 1 ms. Alternatively, the cycle could be slower and have a duration of a multiple of the frame duration, e.g. 4 or 8 ms. The FIG. 3 shows an example of scheduler cycle timing.

Figure 3:
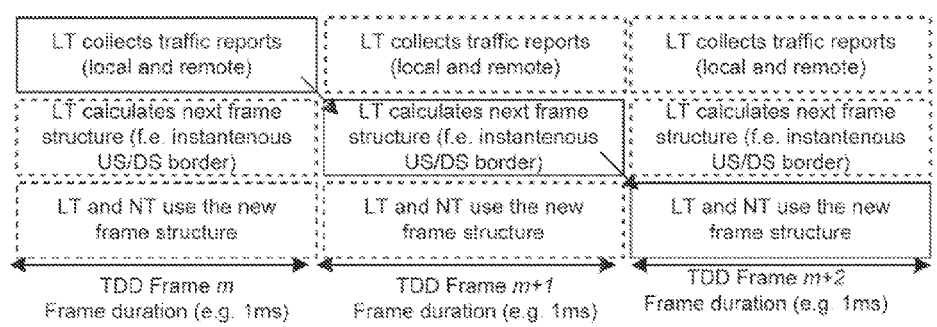
FIG. 3 illustrates an example of timing of a procedure in relation to TDD frames, according to an exemplifying embodiment.

In the first phase of the exemplifying cycle in FIG. 3, the LT, e.g. the LT scheduler, collects traffic reports from its local queues as well as from remote NT queues, e.g. by a request/response protocol. Such a protocol may introduce a round trip delay of 1 TDD frame, or more, when collecting remote traffic reports.

In the second phase in the example in FIG. 3, the LT scheduler calculates a frame structure on each line given e.g. the most recent traffic reports, the traffic descriptors, configured frame partitions, as well as actual attainable line rate.

In the third and last phase of the cycle in FIG. 3, LT and NT use the new frame structure, e.g. the newly computed, instantaneous DS/US frame border.

Bandwidth Assignment

Assigning fixed bandwidth is a relatively easy task for a transceiver node. A scheduler statically assigns the configured sum of downstream fixed components $\mathrm{sum}_j(F_{D,i\text{-}j})$, as well as upstream fixed components $\mathrm{sum}_j(F_{U,i\text{-}j})$ for each line i under the assumption that that the relations expressed in formulas 1.1 and 1.2 hold. As fixed bandwidth is always assigned, regardless of queue occupancy, i.e. the content of traffic reports, this fixed algorithm does not require any addition beyond the TDs, partitions, and attainable rate. Thus, phase 1 of the scheduler cycle illustrated in FIG. 3 is not required when assigning only fixed bandwidth.

However, assigning assured bandwidth when applying DBA, as suggested herein, requires a dynamic algorithm that takes traffic reports into account. A traffic report may contain e.g. the number of bytes that are waiting in a queue, possibly together with some optional color information (green, read, yellow) etc., where the color information may reflect the priority of the data waiting in the queue. The dynamic algorithm may take the queue occupancy of any queue into account, in order to estimate the instantaneous rate demand for a given queue on a given link. This data (i.e. the estimates) may be compared to the assured rate configuration $sum_j$ ($A_{D,i-j}$) or $sum_j(A_{U,i-j})$ of each line and granted up to the configured level. Any remaining rate in DS or US due to 1) actual demand of assured traffic being below configured level, or 2) F+A is configured below the full rate partition, may be subject to non-assured assignments, which may impact the partition border. When there are line(s) that have a higher demand than what is possible given a certain partitioning, the DS/US border can be moved (adjusted) within the frame, to allow peak traffic transmission.

Figure 4:
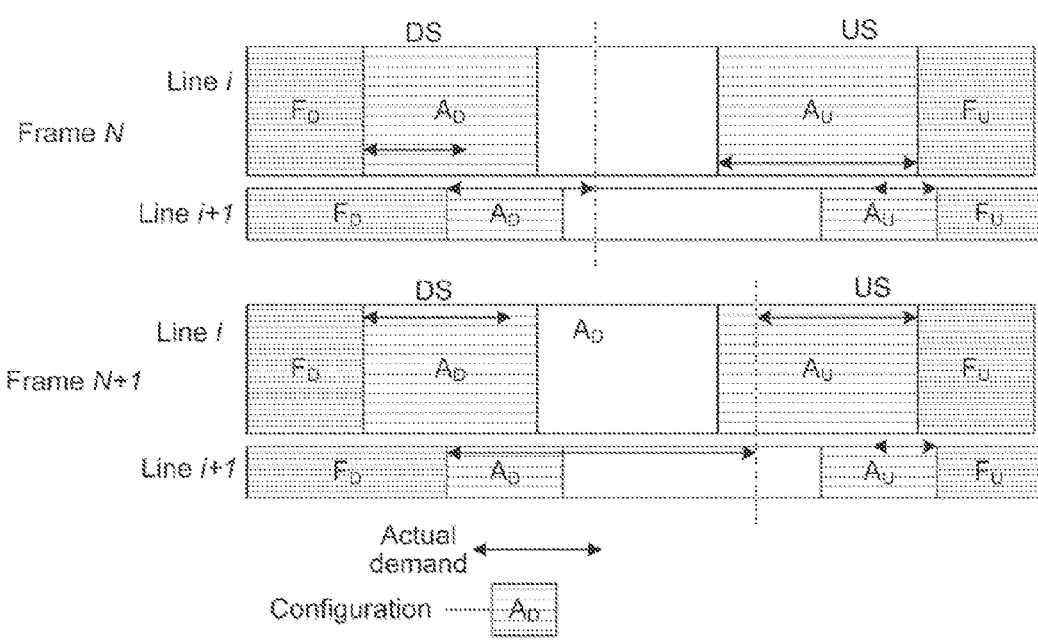
FIG. 4 illustrates the adjustment of a US/DS border (instantaneous partitioning), according to an exemplifying embodiment.

FIG. 4 illustrates an example where a momentary demand of line i+1 exceeds the DS part of the configured DS/US partitioning, and where the downstream part of a TDD frame is extended (widened) to enable DS transmission in accordance with the current demand or need of line i+1. In order to extend/expand the DS part of a frame, the US part must be correspondingly reduced.

In case several lines experience peaks, the non-assured rate could be given to lines with a certain given priority. The non-assured rate could be assigned e.g. in proportion to A+F (Assured rate+Fixed rate) or by a configurable priority, p, being part of the traffic descriptor TD. Further, the use of a max rate parameter, M, in the TD allows to cap non-assured rate demand for a given queue. For example, an operator may provide low-price services only allowing a certain rate.

In more detail, FIG. 4 shows a traffic situation in two lines, line i and line i+1, in two frames, frame N and frame N+1. Each line is associated with a configured traffic profile comprising a Fixed rate F and an Assured rate A in each direction, i.e. US and DS. The double-directed arrows illustrate the actual demand, given by the current fill status of DS and US queues. In the example situation illustrated in FIG. 4, there are no conflicting demands, and therefore the US/DS frame border may be located such that both US and DS demands in both lines may be satisfied. If the US demand for resources in line i in frame N+1 would have been higher within the Assured US rate, the US/DS border in frame N+1 would have been placed further to the left, such that, at least, the Assured rate was provided. Other conflicting demands may be solved by taking priority aspects into consideration. However, an Assured rate should be provided when needed.

Examples of Advantages of the Suggested Technology
1. Maximum capacity utilization on rate-constrained copper links
2. Suitable for implementation/relatively "easy" to implement.

Exemplifying System, FIG. 2

FIG. 2 illustrates a schematic view of an exemplifying DSL TDD Dynamic Bandwidth Assignment, DBA, architecture. The part schematically marked with 201 may represent a transceiver node, cf. transceiver node 701 in FIG. 7, comprising a Line Terminal, LT, which in its turn comprises a Traffic scheduler. The transceiver node, which may also be denoted e.g. a bi-directional multi-line TDD transmission apparatus or transceiver, is adapted to provide dynamic bandwidth assignment capabilities, in accordance with an example of the herein suggested technology. The transceiver node may be a so-called DSLAM located e.g. in a central office. In case of short loops, it could be located e.g. in the basement of a building.

The transceiver node 201 comprises a line terminal (LT) providing access to a plurality/multitude of loops, where each loop is terminated by its individual network terminals (NT). The loops would typically be made of metal, such as copper. Copper loops connected to a single LT are typically part of a cable binder routing loops to different NTs at the end of the bundle.

Each line, or loop, may be configured to use a given portion of the downstream attainable rate for downstream transmission, and may be configured to use a given portion of the upstream attainable rate for upstream transmission. The partitioning, or partition border, of a frame may be expressed in terms of a symmetry ratio, e.g. 80/20, or alternatively by upstream/downstream portions defined as the number of DMT symbol positions used for upstream/downstream over the whole number of symbols per TDD frame.

The transceiver node 201 allows attaching at least one FIFO queue for traffic scheduling at LT side and NT side. Two queues can be paired, where the pair consists of one downstream queue at the transceiver node/LT side and one upstream queue at the NT side, to provide a bi-directional scheduled unicast flow between LT and NT connected via a given point-to-point copper loop. Also an arbitrary number of queues can be attached to LT and/or NT to provide traffic scheduling for multi-cast and broad-cast traffic.

Further, the transceiver node is adapted to allow and to configure a traffic descriptor, TD, to each queue. The TD may comprise e.g. the following traffic contract components: Fixed rate, assured rate, maximum rate and a non-assured rate. The TD may also comprise optional color/priority marks, e.g. for metering purposes.

For example, each queue could be configured to report its current traffic fill status on request. Such a traffic report may include e.g. the raw number of bytes waiting, the number of frames together with frame length and/or a color associated with a frame, and similar measures. Further, the traffic report should preferably contain the queue ID as well as a provisioned queue size. Data in the traffic report can be encoded in different ways, such as linear encoding or logarithmic encoding.

The transceiver node could be adapted e.g. to periodically request and collect traffic reports locally, e.g. within the LT, and remotely from all active NTs in a given cycle time. Local traffic reports within the LT may be collected e.g. over a local data bus. Remote traffic reports, collected from NTs, may be collected e.g. by use of a real-time control request/response protocol, synchronized to the TDD frame structure.

Focusing on the function of the traffic scheduler in the exemplifying architecture in FIG. 2, such a traffic scheduler could be operable to assign bandwidth to any active NT based on information from traffic descriptors as well as traffic reports. The traffic scheduler may operate in repeated scheduling cycles, in which traffic reports may be requested and collected from all NT and LT assigned queues e.g. in a first cycle; a frame structure may be calculated for a next frame, e.g. based on comparing configured traffic profiles with actual demand from reports in a second cycle; and the new frame structure to be used may be communicated/indicated to all NTs in a control channel (e.g. bandwidth map) in a third cycle, and LT and NT may then put the new frame structure into force within e.g. the third or a fourth cycle.

Further, during a line bring-up, the traffic scheduler may read attainable rates per direction of each NT/LT line pair and check the feasibility of a given traffic profile given knowledge of all traffic descriptors, i.e. sum of all fixed and assured rates over all queues per direction. The traffic scheduler may be adapted to assign fixed rate components to each LT-NT link within the limits of the actual attainable rates per link direction. Fixed transmit opportunities are scheduled in any frame. Further, the traffic scheduler may be adapted to assign assured and/or non-assured rate components to each LT-NT link pair given data in traffic descriptors and traffic reports. Assured traffic per link may be assigned up to the configured assured limit. If the assured limit is not reached, the traffic scheduler may be allowed to grant non-assured rate to other transmit directions of its own line or other lines within a binder on the same LT. This is done by changing the instantaneous upstream/downstream partition border. This procedure during line bring-up, is illustrated in FIG. 6, showing an exemplifying method comprising determining 602, at line bring-up, attainable rates per direction of each LT/NT line pair. The attainable rates are compared 604 with related configured traffic profiles, which could be denoted e.g. Traffic Descriptors. The feasibility of the configured traffic profiles is determined in an action 606, and the result may be indicated 608 to a concerned node, and/or the node in which the method is performed may act 608 in accordance with the result. After this, as illustrated in FIG. 6, the method illustrated in FIG. 5 may be performed.

Exemplifying embodiments of a method performed by a transceiver node will now be described with reference to FIG. 5. The transceiver node could be the arrangement marked 201 in FIG. 2, or part thereof, comprising e.g. a Line Terminal, LT, which in its turn comprises a Traffic scheduler. The transceiver node is operable to provide bi-directional TDD multi-carrier communication over wire lines, and is coupled to a plurality of loops, where each loop is terminated by a respective network terminal, NT.

Figure 5:
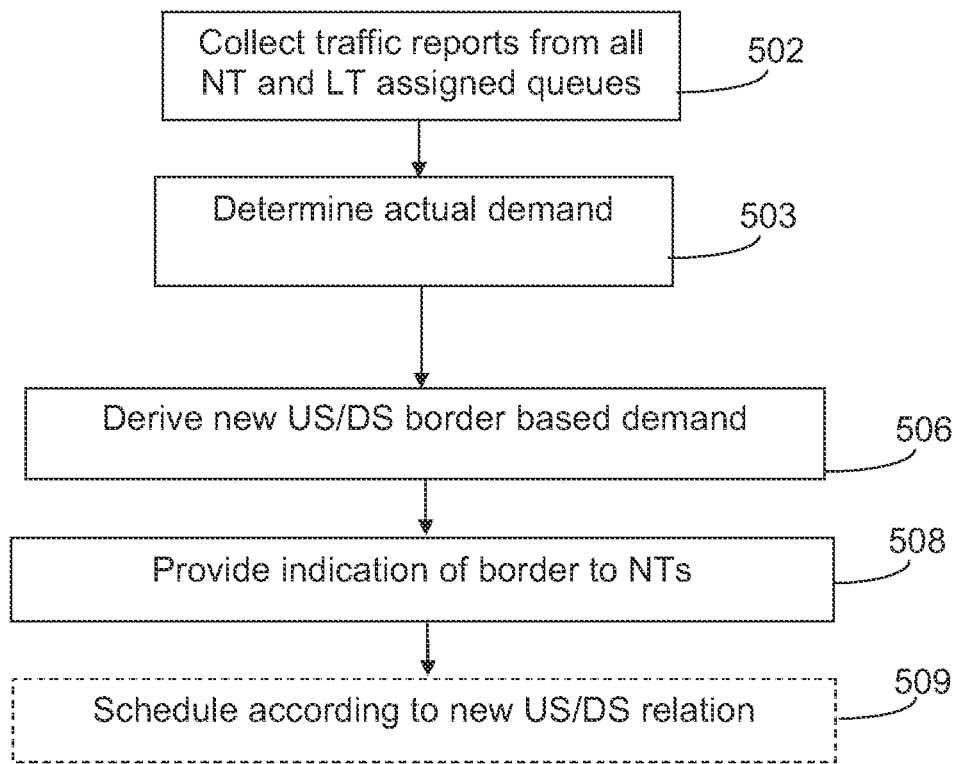
FIG. 5 is a flow chart illustrating a procedure according to an exemplifying embodiment.
Figure 6:
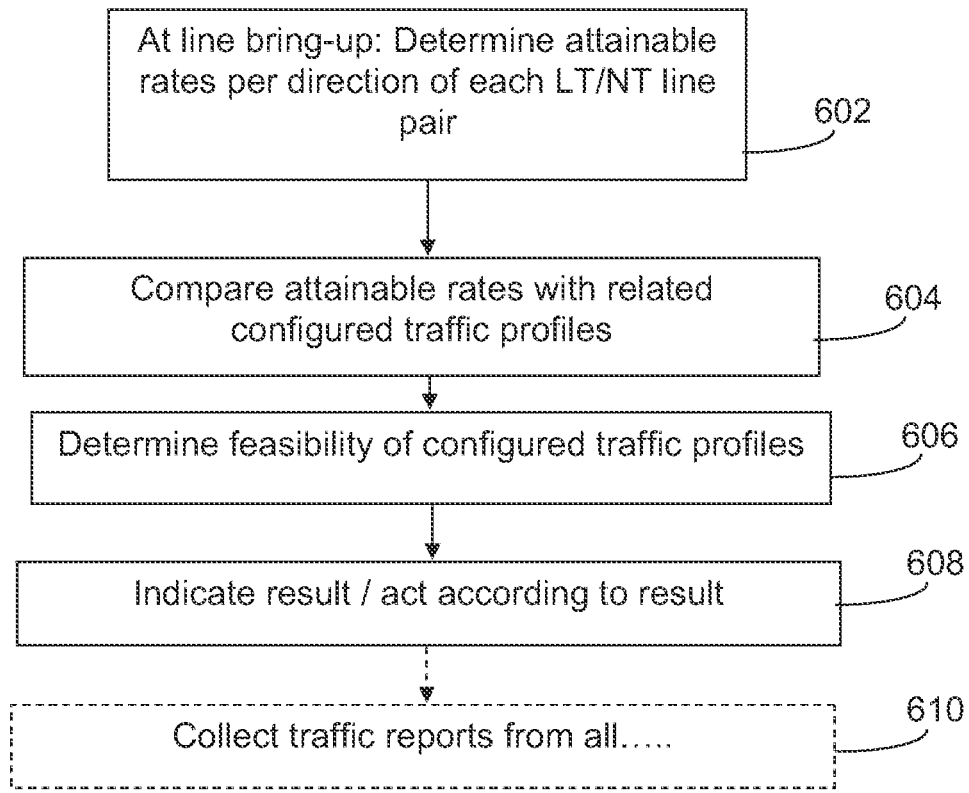
FIG. 6 is a flow chart illustrating a part of the procedure which may be performed at line bring-up, according to an exemplifying embodiment.

FIG. 5 illustrates the method comprising collecting 502 traffic reports from local and remote queues associated with uplink and downlink traffic on the respective plurality of loops. An actual, current, demand for upstream and downstream bandwidth, respectively, is determined 503 for each of the plurality of loops, based on the collected traffic reports. Further an US/DS, frame partitioning is derived 506, based on the determined demand for upstream and downstream bandwidth. The derived US/DS frame partitioning is then indicated 508 to the NTs. Then, the NTs are scheduled 509 in accordance with the derived US/DS frame partitioning. By performing the method illustrated in FIG. 5, dynamic bandwidth assignment is enabled.

As previously described, each loop may be associated with one or more queues, where the queues may be arranged in different US/DS pairs or constellations. The collecting of traffic reports from the queues may be performed by a request-response procedure, i.e. that a request is sent from or within the transceiver node, and a traffic report comprising queue status is sent in response to the request. The actual current demand for US and DS resources, respectively, may be determined for each loop, e.g. by adding together the contents of all DS queues associated with the loop, and determining how much DS resources that would be needed to transmit said DS contents; and adding together the contents of all US queues associated with the loop, and determining how much US resources that would be needed to transmit said contents.

The deriving of an US/DS frame partitioning, or border, could comprise comparing the demands for US/DS resources of the plurality of loops. In the simplest case, there are no conflicting demands, and the border may be set according to the one or more loops having the highest demand in US and DS. The same US/DS frame partitioning is set for the plurality of loops, since individual variations would lead to NEXT.

The derived US/DS partitioning is indicated to the NTs in order for the NTs to know when to send and when to listen. This information could be indicated or provided in any suitable way, e.g. by indicating between which symbols in a frame the border between US and DS is located. When a new US/DS frame partitioning is derived and indicated to NTs, the transceiver node may schedule the NTs in accordance with the new partitioning. The bytes of data waiting in the local queues could be transmitted to the NTs, and the bytes of data waiting in the remote queues could be received from the NTs, to the extent the data could be comprised within the new frame partitioning.

Each queue may be associated with a configured traffic profile related to upstream or downstream rates. The configured traffic profile could be represented by and/or described in e.g. a Traffic Descriptor, as previously described. The configured traffic profiles could comprise traffic contract components, such as an Assured rate, and one or more of e.g. a Fixed rate, a Maximum rate, a non-assured rate and a Priority, as previously described. The deriving of a US/DS frame partitioning may be based on said configured traffic profiles, in addition to being based on the current demand. The current demand of the loops could be compared to the configured traffic profiles of the loops in order e.g. not to violate the fixed rate contract of any of the loops. That is, the US/DS partitioning should not deprive any of the loops on their contracted fixed rate which could be illustrated by that the dashed border in FIG. 4 should not be placed within the areas marked $F_D$ or $F_U$.

The configured traffic profiles could further be associated with, or comprise a traffic contract component related to a maximum rate. The maximum rate may be associated e.g. with the type of subscription the owner of the NT has with a service provider, or with the capabilities of the loop and/or NT. The configured traffic profiles could further be associated with, or comprise, a traffic contract component related to a priority. Such a priority component may be related e.g. to the type of subscription the owner of the NT has with a service provider. The configured traffic profiles could further be associated with, or comprise, color or priority marks e.g. for metering purposes. The configured traffic profiles could further be associated with, or comprise a traffic contract component related to a fixed rate, which is beneficial e.g. for delay sensitive traffic, such as voice traffic.

The collected traffic reports reflect the current fill status of a respective queue. A traffic report could comprise a raw number of bytes waiting in the queue; a number of frames waiting in the queue together with a frame length; a color or priority associated with the frames; a queue ID and/or a provisioned queue size.

The collecting, deriving and providing may be performed in consecutive cycles, as illustrated in FIG. 3. Traffic reports may be collected from all remote and local queues associated with the plurality of loops within one such cycle. In order to achieve this, a real-time control request/response (RR) protocol could be used for collecting traffic reports, at least from the NTs in the remote ends of the loops. Such a protocol should be synchronized to the TDD frame structure. Thereby, the traffic reports could be acquired in a controlled way, and the traffic reports collected in one cycle will reflect the same time period, and thus be suitable to serve as a base for decisions related to dynamic frame partitioning.

Figure 7:
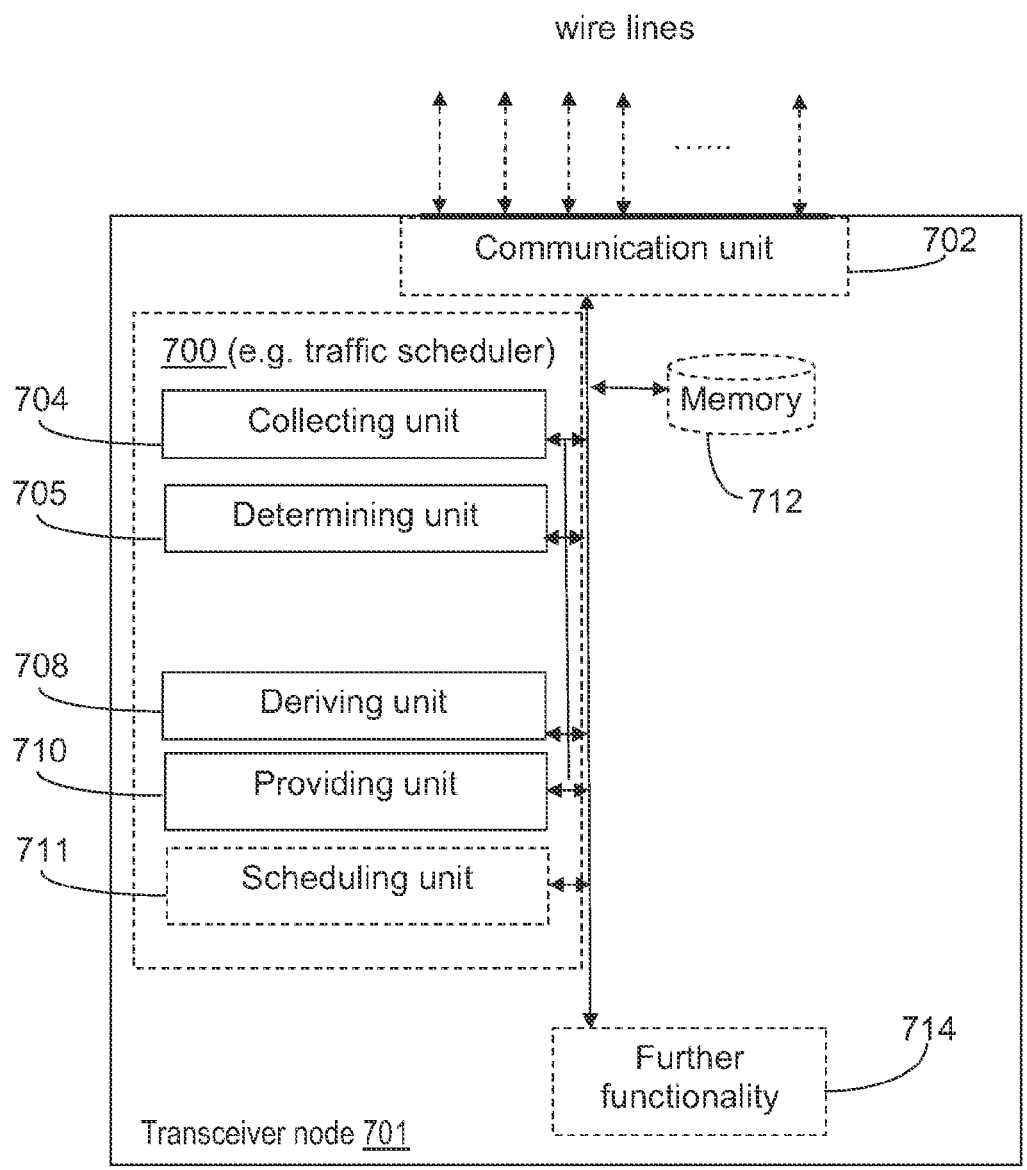
FIG. 7 is a block chart illustrating a transceiver node according to an exemplifying embodiment.

Exemplifying Transceiver Node, FIG. 7

Embodiments described herein also relate to a transceiver node. The transceiver node is adapted to perform at least one embodiment of the method in a transceiver node described above. The transceiver node is associated with the same technical features, objects and advantages as the method described above and illustrated e.g. in FIGS. 5 and 6. The transceiver node will be described in brief in order to avoid unnecessary repetition.

Below, an exemplifying transceiver node 700, adapted to enable the performance of an above described method will be described with reference to FIG. 7. The transceiver node is operable for bi-directional Time Division Duplexing, TDD, multicarrier communication over wire lines, the transceiver node being connectable to a plurality of loops, where each loop is terminated by a respective network terminal, NT. The part of the transceiver node which is most affected by the adaptation to the herein described method is illustrated as an arrangement 701, surrounded by a dashed line. The arrangement 701 may be, or be a part of an arrangement such as the arrangement illustrated as 201 in FIG. 2. The transceiver node 700 and arrangement 701 are further illustrated as to communicate with other entities via a communication unit 702 comprising means for wired communication. The transceiver node or arrangement may further comprise other functional units 707, such as codecs, and may further comprise one or more storage units 706.

The arrangement part of the transceiver node may be implemented and/or described as follows:
The arrangement comprises a collecting unit 704, adapted to collect traffic reports from local and remote queues associated with uplink and downlink traffic on the plurality of loops. The arrangement further comprises a determining unit 705, adapted to determine an actual demand for upstream and downstream bandwidth, respectively, for each of the plurality of loops, based on the collected traffic reports. The arrangement further comprises a deriving unit 708, adapted to derive an US/DS frame partitioning (border location within a frame) based on the actual demand for upstream and downstream bandwidth; and a providing unit 710, adapted to provide an indication of, i.e. to indicate, the derived US/DS frame partitioning to the NTs. The arrangement may further comprise a scheduling unit 711, adapted to schedule NTs in accordance with the derived US/DS frame partitioning.

Each queue may be associated with a configured traffic profile related to upstream or downstream rates, and the deriving of a US/DS frame partitioning may be further based on said configured traffic profiles. For example, the determined actual demand may be compared with the configured rates in order to derive a new US/DS frame partitioning which does not violate the configured traffic profile/s associated with any loop, e.g. given a certain demand on said loops.

A configured traffic profile may comprise a traffic contract component related to an Assured rate. The Assured rate should be provided if needed, as previously described. A configured traffic profile may further comprise a traffic contract component related to a maximum rate; a traffic contract component related to a non-assured rate; color or priority marks e.g. for metering purposes and/or a traffic contract component related to Fixed rate.

The derived US/DS frame partitioning is applied for each of the plurality of loops, at least when the loops belong to the same cable binder.

The transceiver node may further be adapted to assign and configure a traffic profile to each queue, where the traffic profile comprises an Assured rate traffic contract component, and possibly one or more of the traffic contract components: Fixed rate, maximum rate, non-assured rate; and/or color/priority marks. The traffic profile could be configured in form of a Traffic Descriptor associated with the queue.

The transceiver node may comprise at least one traffic scheduler, e.g. the scheduling unit 711 adapted to assign bandwidth to any NT based on traffic profiles and traffic reports. The traffic reports are related to the situation in a certain time period, e.g. a scheduling cycle The transceiver node may work in repeated scheduling cycles, wherein traffic reports are collected from remote and local queues in a first cycle, a next US/DS frame partitioning structure is derived based on configured traffic profiles and actual demand in a second cycle, the derived frame partitioning structure is provided to the entities concerned in a third cycle; and wherein the determined frame partitioning structure is put into force within the third or a fourth cycle. Such cycles are illustrated in FIG. 3.

The arrangement 700, which may also be denoted e.g. Line Terminal, or the transceiver node 701, or parts thereof, could be implemented e.g. by one or more of: dedicated hardware elementary processing units, such as transistors, logic gates, etc., realized as integrated circuits or discrete components; a Programmable Logic Device (PLD), such as FPGA or ASIC; a processor or a micro processor and adequate software and memory for storing thereof, or other electronic component(s) or processing circuitry configured to perform the actions described above.

The transceiver node 701 may comprise a collecting unit 704, adapted to collect traffic reports from local and remote queues. The transceiver node may further comprise a determining unit 705, adapted to determine an actual demand per line and direction, based on the traffic reports; a comparing unit 706, adapted to compare the actual demand with configured traffic profiles; a deriving unit 708, adapted to derive a new US/DS frame partitioning (border location within a frame) based on the result of the comparison. The transceiver node may further comprise a providing unit 710, adapted to provide an indication of the new US/DS frame partitioning to NTs in remote end of wire lines, and locally to relevant parts of the transceiver node. The transceiver node may further comprise a scheduling unit, 711, adapted to schedule transmission resources in accordance with the new US/DS frame partitioning. Thereby, the transceiver node is adapted to provide capabilities for dynamic bandwidth assignment.

Figure 8:
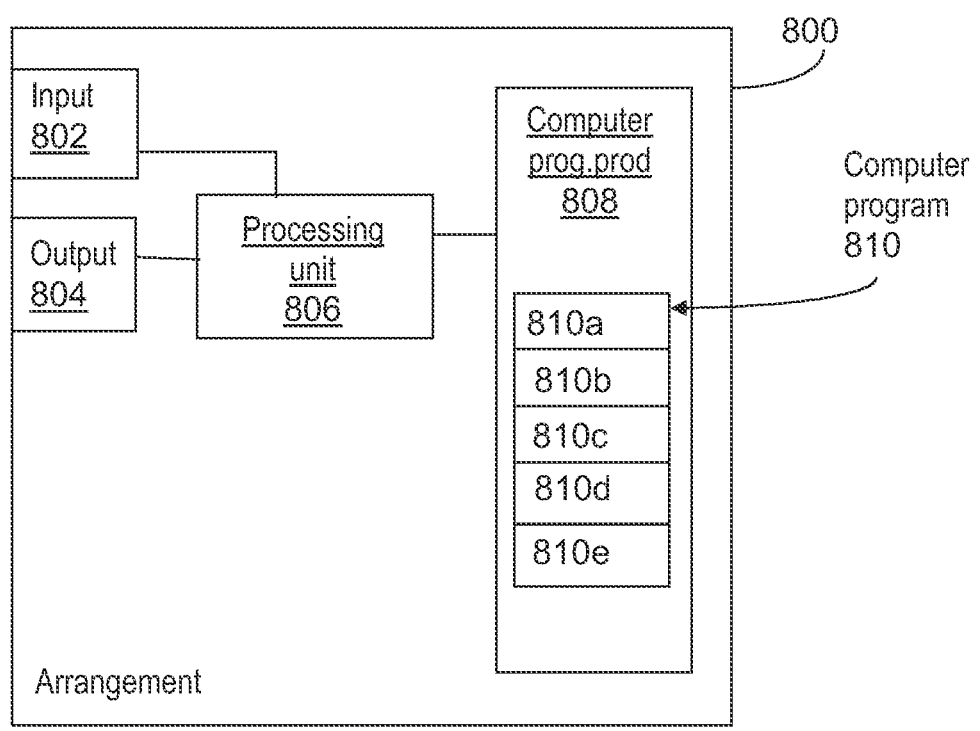
FIG. 8 is a block chart illustrating an arrangement according to an exemplifying embodiment.

Exemplifying Transceiver Node, FIG. 8

FIG. 8 schematically shows a possible embodiment of an arrangement 800, which also can be an alternative way of disclosing an embodiment of the arrangement or traffic scheduler 701 in the transceiver node 700 illustrated in FIG. 7, or part thereof. Comprised in the arrangement 800 are here a processing unit 806, e.g. with a DSP (Digital Signal Processor). The processing unit 806 may be a single unit or a plurality of units to perform different actions of procedures described herein. The arrangement 800 may also comprise an input unit 802 for receiving signals from other entities or nodes, and an output unit 804 for providing signals to other entities or nodes. The input unit 802 and the output unit 804 may be arranged as an integrated entity.

Furthermore, the arrangement 800 comprises at least one computer program product 808 in the form of a memory, e.g. an EEPROM (Electrically Erasable Programmable Read-Only Memory), a flash memory and a hard drive. The computer program product 808 comprises a computer program 810, which comprises code means, which when executed in the processing unit 806 in the arrangement 800 causes the arrangement and/or a node in which the arrangement is comprised to perform the actions of a procedure exemplified herein.

The computer program 810 may be configured as a computer program code structured in computer program modules.

Hence, in an exemplifying embodiment, the code means in the computer program 810 of the arrangement 800 comprises a collecting module 810a for collecting traffic reports from local and remote queues. The arrangement 800 further comprises a determining module 810b for determining an actual demand based on the traffic reports.

The computer program may further comprise a comparing module 810c for comparing actual demand with configured traffic profiles. The computer program further comprises a deriving module 810d, for deriving of a new US/DS frame partitioning based on the traffic reports. The computer program may further comprise a providing module 810e for providing an indication of the new US/DS frame partitioning e.g. to NTs in remote end of wire lines.

Although the code means in the embodiment disclosed above in conjunction with FIG. 8 are implemented as computer program modules which when executed in the processing unit causes the arrangement or transceiver node to perform the actions described above in the conjunction with figures mentioned above, at least one of the code means may in alternative embodiments be implemented at least partly as hardware circuits.

As previously mentioned, the processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the transceiver node 701.

The dynamic bandwidth assignment described herein may alternatively be denoted e.g. dynamic resource assignment, DRA. The DRA functionality coordinates the downstream and upstream transmit opportunities over the coordinated group. The allocation of downstream and upstream transmit opportunities may be static i.e., constant over time as set by a transceiver node or Management Entity, or may be dynamic i.e., variable over time, depending on traffic needs and within bounds set by the ME and a Power Control Entity. The entity providing the DRA could receive Dynamic Resource Reports, DRRs from the Layer 2+ functionality for each of the lines (loops) in the coordinated group. The DRRus (upstream) are passed from the NTs to the DRA entity over the lines. The lines may be associated with management information, e.g. in form of traffic descriptors.

The management information imposes bounds on the allocation of upstream and downstream transmit opportunities per subscriber line within the coordinated group. The bounds imposed by the ME on the DRA entity may be related to configuration of US/DS ratio, service level agreements (SLA), etc.

While the method and transceiver node or arrangement suggested above has been described with reference to specific embodiments provided as examples, the description is generally only intended to illustrate the suggested technology and should not be taken as limiting the scope of the suggested methods and arrangements. While described in general terms, the method and arrangement may be applicable e.g. for different types of communication systems applying multicarrier TDD over wire lines.

It is also to be understood that the choice of interacting units or modules, as well as the naming of the units are only for exemplifying purpose, and nodes suitable to execute any of the methods described above may be configured in a plurality of alternative ways in order to be able to execute the suggested process actions. It should also be noted that the units or modules described in this disclosure are to be regarded as logical entities and not with necessity as separate physical entities.

ABBREVIATIONS

DMT discrete multi-tone
FEXT far end cross talk
LT line terminal
NEXT near end cross talk
NT network terminal
OFDM orthogonal frequency-division multiplexing
TDD time division duplexing.

The invention claimed is:

1. A method performed by a transceiver node, operable to provide bi-directional Time Division Duplexing (TDD) multicarrier communication over wire lines, the transceiver node being coupled to a plurality of loops, wherein each loop is terminated by a respective network terminal (NT), the method comprising:
   collecting traffic reports from local and remote queues associated with uplink and downlink traffic on the plurality of loops, wherein a queue from the queues is associated with a configured traffic profile related to upstream or downstream rates, and wherein the configured traffic profile includes a traffic contract component related to an assured rate, wherein the assured rate is a rate that is guaranteed to be provided on a loop when needed and that can be granted to other transmit directions of the loop or other loops when the loop is not fully utilizing the assured rate;
   determining an actual demand for upstream and downstream bandwidth, respectively, for each of the plurality of loops, based on the collected traffic reports;
   deriving an Upstream/Downstream (US/DS) frame partitioning based on the determined actual demand for upstream and downstream bandwidth and the configured traffic profile;
   providing an indication of the derived US/DS frame partitioning to the NTs; and
   scheduling NTs in accordance with the derived US/DS frame partitioning.

2. The method according to claim 1, wherein the derived US/DS frame partitioning is applied for each of the plurality of loops.

3. The method according to claim 1, wherein the configured traffic profile is further associated with at least one of:
   a traffic contract component related to a maximum rate,
   a traffic contract component related to a non-assured rate,
   color or priority marks, and
   a traffic contract component related to a fixed rate.

4. The method according to claim 1, wherein the collected traffic reports reflect a current fill status of the respective local and remote queues, and comprises information on one or more of:
   a raw number of bytes waiting in the queue,
   a number of frames waiting in the queue together with a frame length, a color or priority associated with the frames,
a queue ID, and
a provisioned queue size.

5. The method according to claim 1, wherein the collecting, deriving, and providing are performed in consecutive cycles.

6. The method according to claim 1, wherein traffic reports are collected from all queues within one cycle.

7. The method according claim 1, wherein the traffic reports are collected from NTs by use of a real-time request/response protocol, which is synchronized to a TDD frame structure.

8. A transceiver node operable for bi-directional Time Division Duplexing (TDD) multicarrier communication over wire lines, the transceiver node being connectable to a plurality of loops, wherein each loop is terminated by a respective network terminal (NT), the transceiver node comprising:
  a processor configured to execute a collecting unit, a determining unit, a deriving unit, a providing unit, and a scheduling unit,
  the collecting unit, when executed by the processor, is to collect traffic reports from local and remote queues associated with uplink and downlink traffic on the plurality of loops, wherein a queue from the queues is associated with a configured traffic profile related to upstream or downstream rates, and wherein the configured traffic profile includes a traffic contract component related to an assured rate, wherein the assured rate is a rate that is guaranteed to be provided on a loop when needed and that can be granted to other transmit directions of the loop or other loops when the loop is not fully utilizing the assured rate,
  the determining unit, when executed by the processor, is to derive an actual demand for upstream and downstream bandwidth, respectively, for each of the plurality of loops, based on the collected traffic reports,
  the deriving unit, when executed by the processor, is to derive an Upstream/Downstream (US/DS) frame partitioning based on the determined actual demand for upstream and downstream bandwidth and the configured traffic profile;
  the providing unit, when executed by the processor, is to provide an indication of the derived US/DS frame partitioning to the NTs, and
  the scheduling unit, when executed by the processor, is to schedule NTs in accordance with the derived US/DS frame partitioning.

9. The transceiver node according to claim 8, wherein the configured traffic profile is further associated with at least one of:
  a traffic contract component related to a maximum rate,
  a traffic contract component related to a non-assured priority,
  color or priority marks, and
  a traffic contract component related to a Fixed rate.

10. The transceiver node according to claim 8, wherein the derived US/DS frame partitioning is applied for each of the plurality of loops.

11. The transceiver node according to claim 8, wherein the processor is further configured to execute an assignment unit, the assignment unit, when executed by the processor, is to assign and configure the traffic profile to each queue, the traffic profile comprising the assured rate traffic contract component, and one or more of the traffic contract components: Fixed rate, maximum rate, non-Assured rate, and color/priority marks.

12. The transceiver node according to claim 8, wherein the processor is further configured to execute at least one traffic scheduler, the at least one traffic scheduler, when executed by the processor, is to assign bandwidth to any NT based on traffic profiles and traffic reports.

13. The transceiver node according to claim 8, wherein traffic reports are collected from remote and local queues in a first cycle, a next US/DS frame partitioning structure is derived based on configured traffic profiles and actual demand in a second cycle, the derived next US/DS frame partitioning structure is provided to the NTs in a third cycle, and wherein the derived next US/DS frame partitioning structure is put into force within the third or a fourth cycle.

14. A non-transitory computer-readable medium having instructions stored therein, which when executed by a transceiver node, cause the transceiver node to perform operations to provide bi-directional Time Division Duplexing (TDD) multicarrier communication over wire lines, the transceiver node being coupled to a plurality of loops, wherein each loop is terminated by a respective network terminal (NT), the operations comprising:
  collecting traffic reports from local and remote queues associated with uplink and downlink traffic on the plurality of loops, wherein a queue from the queues is associated with a configured traffic profile related to upstream or downstream rates, and wherein the configured traffic profile includes a traffic contract component related to an assured rate, wherein the assured rate is a rate that is guaranteed to be provided on a loop when needed and that can be granted to other transmit directions of the loop or other loops when the loop is not fully utilizing the assured rate;
  determining an actual demand for upstream and downstream bandwidth, respectively, for each of the plurality of loops, based on the collected traffic reports;
  deriving an Upstream/Downstream (US/DS) frame partitioning based on the determined actual demand for upstream and downstream bandwidth and the configured traffic profile;
  providing an indication of the derived US/DS frame partitioning to the NTs; and
  scheduling NTs in accordance with the derived US/DS frame partitioning.

15. The non-transitory computer-readable medium according to claim 14, wherein the derived US/DS frame partitioning is applied for each of the plurality of loops.

16. The non-transitory computer-readable medium according to claim 14, wherein the configured traffic profile is further associated with at least one of:
  a traffic contract component related to a maximum rate,
  a traffic contract component related to a non-assured rate,
  color or priority marks, and
  a traffic contract component related to a fixed rate.

17. The non-transitory computer-readable medium according to claim 14, wherein the collected traffic reports reflect a current fill status of the respective local and remote queues, and comprises information on one or more of:
  a raw number of bytes waiting in the queue,
  a number of frames waiting in the queue together with a frame length,
  a color or priority associated with the frames,
  a queue ID, and
  a provisioned queue size.

18. The non-transitory computer-readable medium according to claim 14, wherein the collecting, deriving, and providing are performed in consecutive cycles.

19. The non-transitory computer-readable medium according to claim 14, wherein traffic reports are collected from all queues within one cycle.

20. The non-transitory computer-readable medium according claim 14, wherein the traffic reports are collected from NTs by use of a real-time request/response protocol, which is synchronized to a TDD frame structure.

* * * * *